A. P. OLSON.
AUTOMOBILE BUMPER AND FENDER.
APPLICATION FILED APR. 18, 1919.
1,332,142. Patented Feb. 24, 1920.
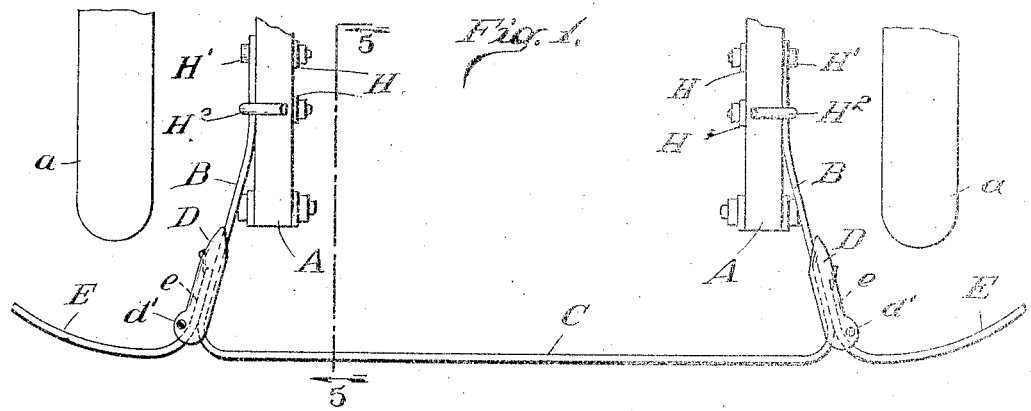
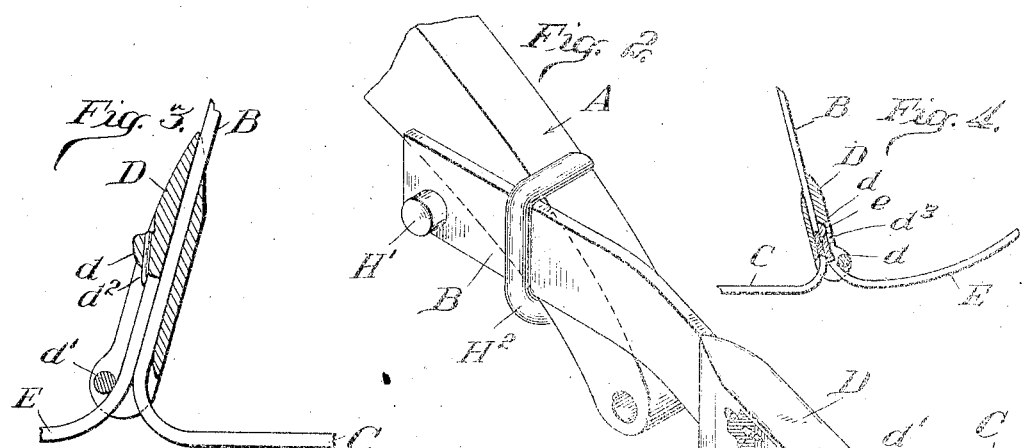
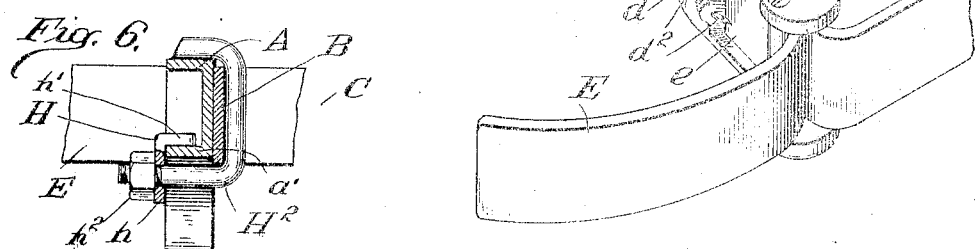
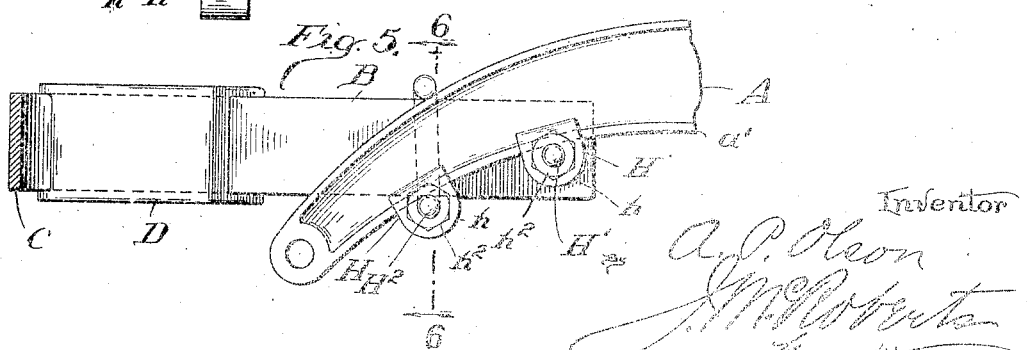
Inventor
A. P. Olson
Attorney

UNITED STATES PATENT OFFICE.

ANDREW P. OLSON, OF CHICAGO, ILLINOIS.

AUTOMOBILE BUMPER AND FENDER.

1,332,142.

Specification of Letters Patent.   Patented Feb. 24, 1920.

Application filed April 18, 1919. Serial No. 290,918.

*To all whom it may concern:*

Be it known that I, ANDREW P. OLSON, a citizen of the United States, residing at Chicago, in the county of Cook and State of Illinois, have invented certain new and useful Improvements in Automobile Bumpers and Fenders, of which the following is a specification, reference being had therein to the accompanying drawing.

My invention relates to automobile bumpers and fenders, and its primary object is to provide a bumper which when attached to either end of the automobile will protect it in the usual manner from injury by collision on the front face of the bumper with other vehicles or objects, and having its ends or wings held by pressure-releasing holding devices which will retain them in position when slight pressure is exerted on the rear face of either wing or end but will yield to release the wing when such pressure is sufficient to overcome their resistance. A further object is to provide an improved attaching device by which the level or height of the bumper on the chassis may be changed without removal and replacement of any of the parts.

In automobile bumpers as now generally constructed a bar or rail extends across the automobile and is attached to the chassis or frame by suitable connections so that when the bumper is struck a blow on its front face, as in collision with another vehicle, the bumper will yield more or less, but in these devices as heretofore made when the rear face of either of its ends is caught by an obstruction or by another vehicle so as to exert a rear or side strain or pressure on the end it is bent or distorted and is frequently damaged beyond repair, or sometimes is torn from the chassis or frame, while the vehicle itself may be damaged. Such accidents frequently happen, as the rear face of one of the ends of the bumper may catch against an obstruction or another vehicle, as for example when the first vehicle itself is backing, or the rear face of the end may be caught by a second moving vehicle when the first vehicle is standing.

By my invention I provide the bumper with end portions or wings which are attached to its body by pressure-releasing holding devices, whereby the wings are normally retained in fixed relation with the body and will offer the same resistance as the body itself to a blow or strain on their front face, but will yield when pressure or strain beyond the resistance of the holding devices is applied on the rear face. Also by my invention the pressure-operated releasing devices may be easily attached so that a wing or end that is broken off may be readily replaced and held in position to restore the bumper to its original shape and condition.

Also, by my invention the devices by which the sides are held on the chassis or frame permit the bumper to be adjusted to vary the height of the front bar so that it may be set at different levels without disassembling any of the parts.

In the accompanying drawings

Figure 1 is a top plan view of a portion of an automobile with an exemplification of my improved fender or bumper attached in position;

Fig. 2 is a detail perspective view of parts of Fig. 1 showing one of the lateral wings and its attaching head or bracket;

Fig. 3 is a detail sectional view of the parts through one of the attaching brackets;

Fig. 4 is a similar view showing a modified form of the pressure-releasing holding device;

Fig. 5 is a detail view on the line 5—5 of Fig. 1, showing a channel-bar of the chassis or frame with the associated arm and attaching means, and Fig. 6 is a sectional view on the line 6—6 of Fig. 5.

Referring to Figs. 1, 2 and 3 of the accompanying drawings, the reference letter A designates the chassis or frame of an automobile or motor vehicle, and B designates a pair of spring side arms attached at one end to the frame by suitable securing means, preferably such as hereinafter described. The arms are bowed or curved so that when they are attached to the frame as shown in Fig. 1 their outer or free ends extend laterally in opposite directions beyond the sides of the frame, and the outer ends of the arms are united by the body of the bumper consisting of the usual flexible and resilient connecting or cross-piece C which will itself bend or yield to blows or strains and may be composed of any suitable elements and material having these capabilities. In the present exemplification the cross-piece is a spring strip integral with the side arms and may be provided with a suitable protecting covering, such as a rubber facing or envelop.

The outer end of each arm is provided with a metallic bracket D, which is rectangular in shape and is hollow to provide a chamber to receive the associated side arm as shown, the inner end of the chamber snugly fitting the arm and its outer end being somewhat enlarged in width or cross-sectional area to also receive the inner angular end or heel $e$ of one of the end portions or wings E which passes into the front of the chamber. The outer side wall $d$ of each bracket terminates at about the center of the chamber to provide an outwardly open side, and the top and bottom walls are connected at their outer ends by a vertical rib $d'$ preferably integral with the bracket. The outer end of the side wall $d$ carries the yielding pins $d^2$ which overlie the opening in the side of the chamber and bear upon the inner end of the angular heel $e$ of the associated wing. The arrangement and disposition of the parts are such that the angular heel $e$ of each wing and its associated side arm B snugly fit within the chamber of the bracket, the heel being held snug against its associated arm by the pins, and no looseness or rattling occurs. The wings are made of flexible and resilient metal strips and extend or project into or beyond the line of the wheels $a$ of the vehicle as usual.

The pins $d^2$ may be made of either flexible or breakable material; they are intended to resist a counter blow or pressure that may be taken up or compensated by the flexibility of the wing itself, and to release the wing under greater or increased pressure or blow.

In the form shown in Fig. 4 the correspondingly lettered parts are the same in construction and arrangement as in the other figures, but the pins of each bracket are replaced by a stove-bolt $d^3$ which passes through the heel of the wing and associated side arm.

When a blow or pressure is exerted upon the front face of any portion of the bumper the resistance is provided in the usual manner, and as the heels of the wings are backed by the side arms the wings are held in place. But when a blow or strain is exerted upon the rear face of a wing its flexibility allows the wing to yield up to the resistance point of the pressure-releasing element or means, and further pressure results in the yielding of the latter to release the wing which will then merely swing or pivot on the end rib $d'$ and its heel will freely pass out of the opening in the outer side wall of the bracket. The released wing if not permanently bent or distorted, or a duplicate of it if it is so damaged, may be quickly replaced and mounted in position by providing new pressure-releasing holding elements or means. The pressure pins $d^2$ are snugly held in passages or holes in the end of the wall $d$, and after they are bent or fractured they may be easily taken out and new ones inserted.

By my invention I obviate the distortion or bending of the bumper which frequently occurs with fenders as now constructed when their ends are caught or struck on their rear faces, while my device provides the usual protection against ordinary accidents by contact with the front face of the bumper or fender. Furthermore, by my invention the parts may be easily and conveniently packed in small compass or package for shipment by merely unfastening the wings, and the heels may be readily slipped into place within the brackets to assemble the bumper when the device is unpacked.

The sides of the chassis or frame are usually curved downwardly toward their outer ends where they are connected to the springs attached to the front or rear axle, and these ends usually take the form of channel bars having upper and lower flanges as shown in Fig. 5. In the present exemplification of the feature of my invention for adjustably mounting the fender, the lower flange $a'$ of each channel bar supports a pair of angular lugs H whose vertical webs $h$ extend below the bar and whose horizontal flanges $h'$ rest upon the lower flange of the bar. The web of each lug carries an attaching device, and for each rear lug this is in the form of a headed-bolt H' which passes below the bar and through the rear end of the associated side arm B with its head drawn against the arm when its nut $h^2$ is set down against its lug, while each front lug is provided with a retaining clip H² formed to pass under the channel bar and the side arm and thence upwardly outside the arm and upon the upper flange of the channel bar, so that when its nut $h^2$ is set down against the lug the side arm is held in place. By this construction the side arms of the fender or bumper are pivotally mounted on the rear bolts H', and their free ends can be swung up or down by adjusting the front clips H² along the bars toward or away from the rear bolts to raise or lower the outer ends of the arms and the associated cross-piece or body C of the bumper or fender.

I claim:

1. An automobile fender having a front cross-piece and side-arms adapted to be secured to the automobile frame, a bracket on the outer end of each arm, a wing detachably pivoted on each bracket, means to hold each wing in place against pressure on its front face, and a pressure-releasing device connecting each wing to its bracket.

2. An automobile fender comprising a body composed of a pair of arms adapted to be secured at one end to an automobile and a cross-piece at the other ends of the arms, and wings extended laterally from the arms, and pressure-operated releasing means connecting the wings to the body.

3. An automobile fender comprising a body composed of a pair of arms adapted to be secured at one end to an automobile, and a cross-piece at the other ends of the arms, and brackets on the body, wings extended laterally from the brackets, and pressure-operated releasing means connecting the wings to the brackets.

4. In an automobile fender, a pair of arms secured to the frame, a cross-piece carried by the arms, a bracket on each arm having an opening in the outer side and a rib at its end, a wing extending laterally from each bracket and having a heel inside the bracket-rib, and pressure-operated releasing pins on each bracket overlying the inner end of the heel of the associated wing.

5. In an automobile fender, a pair of arms adapted to be secured at one end to an automobile, a cross-piece secured to the other ends of the arms, brackets having chambers fitting the arms at their inner ends and flared at their outer ends, each bracket having an opening in its outer side wall and a vertical rib at its outer end, yielding pins on each bracket overlying its side opening, and a pair of lateral wings each having an angular heel to enter the chamber of a bracket under the said pins.

6. In a device of the class described, a frame having downwardly curved outer ends, a pair of arms having their outer ends projecting beyond the frame and provided with a connecting-piece, means to pivotally mount the inner ends of the arms on the frame, a pair of clips adjustably mounted on the frame in front of the pivots of the arms and embracing the arms and frame ends, and means to secure the clips in position along the frame ends to raise or lower the outer ends of the arms.

7. In a device of the class described, a frame having downwardly curved outer ends in the form of channel bars, a pair of arms having their free ends projecting beyond the frame and provided with a connecting-piece, lugs on the lower flanges of the bars and having bolts forming pivots for the inner ends of the arms, a second pair of lugs mounted on said flanges in front of the pivots of the arms, clips carried by said second lugs and embracing the arms and frame ends, and means to secure the second lugs in position along the bars to raise or lower the outer ends of the arms.

In testimony whereof I affix my signature in presence of two witnesses.

ANDREW P. OLSON.

Witnesses:
   J. McRoberts,
   Bernice Gormley.